United States Patent
Jäger

(10) Patent No.: US 6,328,475 B1
(45) Date of Patent: Dec. 11, 2001

(54) AIR BEARING, IN PARTICULAR FOR THE SHAFT OF A MOTOR SPINDLE

(76) Inventor: Alfred Jäger, Siemensstrasse 8, D-61239 Ober-Mörlen (DE)

( * ) Notice: Subject to any disclaimer, the term of this patent is extended or adjusted under 35 U.S.C. 154(b) by 0 days.

(21) Appl. No.: 09/508,673

(22) PCT Filed: Aug. 3, 1999

(86) PCT No.: PCT/DE99/02360

§ 371 Date: Mar. 28, 2000

§ 102(e) Date: Mar. 28, 2000

(87) PCT Pub. No.: WO00/08345

PCT Pub. Date: Feb. 17, 2000

(30) Foreign Application Priority Data

May 8, 1998 (DE) ............................................. 198 35 339

(51) Int. Cl.[7] .................................................. F16C 32/06
(52) U.S. Cl. ..................... 384/107; 384/121; 384/907.1; 384/912
(58) Field of Search .................. 384/107, 121, 384/907.1, 912, 110, 111, 118

(56) References Cited

U.S. PATENT DOCUMENTS

| | | |
|---|---|---|
| 3,645,590 | 2/1972 | Bird et al. . |
| 4,982,126 | 1/1991 | Jolivet et al. . |
| 5,017,022 | 5/1991 | Ruggles et al. . |
| 5,692,840 | 12/1997 | Rhoton et al. . |
| 5,998,898 | * 12/1999 | Fukutani et al. . |

FOREIGN PATENT DOCUMENTS

| | | |
|---|---|---|
| 683 844 | 5/1994 | (CH) . |
| 2124918 | 8/1972 | (DE) . |
| 255 373 | 3/1988 | (DE) . |
| 0 471 329 | 2/1992 | (EP) . |
| 0 606 970 | 7/1994 | (EP) . |

OTHER PUBLICATIONS

Patent Abstracts of Japan, vol. 1996, No. 8, Aug. 30, 1996 & JP 08–105443 (Nippon Carbon), Apr. 23, 1996.
Patent Abstracts of Japan, vol. 18, No. 583, Nov. 8, 1994 & JP 06–213236 (Canon), Aug. 2, 1994.
W. J. Bartz et al, Luftlagerungen, Expert Verlag, 1982, ISBN 3–8169–0992–2, pp. 22 and 99.

* cited by examiner

*Primary Examiner*—Lenard A. Footland
(74) *Attorney, Agent, or Firm*—Arent Fox Kintner Plotkin & Kahn, PLLC

(57) ABSTRACT

An air bearing (1) for a shaft (2), adapted to rotate at high peripheral speed, of a motor spindle for driving a machining tool includes a shaft (2) having bearing surfaces (3, 5, 6) and mating bearing surfaces (9, 11) of bearing elements (8, 10) which are equipped with several bearing pockets (13). The bearing pockets (13) communicate, via bores (14, 15) in the bearing elements (8, 10), with a source of compressed air. The bearing elements (8, 10) are made of graphite whereby the air bearing's (1) function is not adversely affected by temporary overloading.

2 Claims, 1 Drawing Sheet

AIR BEARING, IN PARTICULAR FOR THE SHAFT OF A MOTOR SPINDLE

Figure 1:
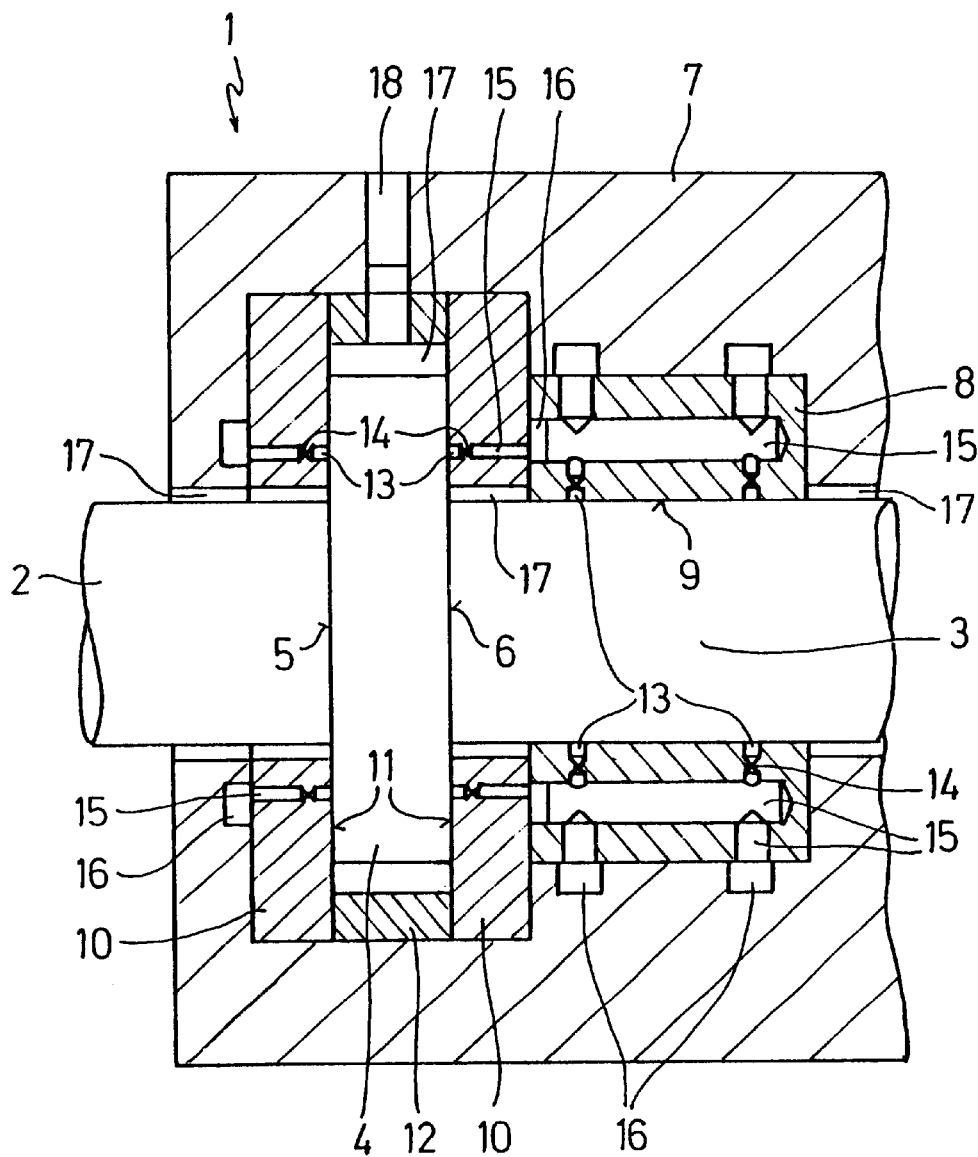

This invention relates to an air bearing for a rotor adapted to rotate at (high peripheral speed, in particular for the shaft of a motor spindle for driving a machining tool, with provision being made for an air gap between a bearing surface of the rotor and a mating bearing surface of a stationary bearing element, said mating bearing surface having several bearing pockets communicating via bores in the bearing element with a source of compressed air.

Air bearings of the type referred to are known from DE 21 24 918 A1. They are used primarily for supporting shafts rotating at very high rotational frequency and accordingly high peripheral speed in order to be able to cope with the frictional resistance of the bearing and the resultant heat development in the bearing. With air bearings of this type, the rotor is supported by air cushions that are produced with the aid of air supplied under pressure to the air gap between the bearing surface and the mating bearing surface and which prevent contact between the bearing surface and the mating bearing surface. Contactless bearing of the rotor is guaranteed not only while it is rotating but also when it is stationary. Air bearings are highly sensitive to overloading during operation, i.e., with the rotator rotating at high speed. If, with the rotor running at high speed, contact is made between the bearing surface and the mating bearing surface due to overstepping of the maximum bearing load defined by the load-carrying capacity of the air cushions, the friction resulting from the high relative speed between the bearing surface and the mating bearing surface will instantly cause such intense heating and deformation of the metallic bearing materials that the bearing will seize and be completely destroyed. This sensitivity to overloading poses considerable problems, particularly when air bearings are used for supporting the shafts of high-speed motor spindles for driving machining tools, since an error in controlling the motor spindle movement can result in overstepping of the permissible bearing load and hence in the destruction of the motor spindle bearing.

According to W. J. Bartz et al., Luftlagerungen, Expert Verlag, 1982, ISBN 3-8169-0992-2, pages 22 and 99, the materials suitable for manufacturing air-lubricated plain bearings are metals, ceramic materials and plastics. The use of stainless steels to counter the risk of corrosion is considered possible, but these materials are said as a rule to have poor sliding properties. A ceramic material regarded to have good antifrictional and machining properties is metal-impregnated sintered carbon, a porous sintered graphite impregnated with metals such as white metal, lead bronze, antimony or silver. Tests conducted with copper-impregnated manufactured carbon on the bearing side and steel on the shaft side are also mentioned in connection with improving the antifrictional properties of an airbearinged, hand-held turbine. In this case the bearing material was found to have a greasing tendency, which resulted in clogging of the air bearing nozzles. Antimony- or silver-containing manufactured carbons proved to have better properties as bearing materials but their increased wear in the presence of oil were a disadvantage. By contrast, experiments with ferrotitanide as the bushing material while steel was retained for the shaft material produced significantly better results in terms of wear behavior.

From U.S. Pat. No. 3,645,500 there is known an aerostatically supported roller designed for high speeds and low loads, being comprised of a sleeve made of resin-impregnated carbon graphite. The sleeve is supported on an inner sleeve made of porous carbon graphite, which is carried by a hub provided with channels for the supply of compressed gas. The compressed gas directed through the porous inner sleeve produces a gas film which carries the rotary outer sleeve and centers it relative to the inner sleeve. On failure of the gas film due to overloading or interruption of the gas supply, the sleeve slides on the inner sleeve, with the antifrictional properties observed as this occurred having been good.

It is an object of the present invention to provide an air bearing of the type referred to, which is suitable for a high peripheral speed, is notable for its good load-carrying capacity and long service life and suffers no impairment to its function as a result of temporary overloading. Furthermore, it is desirable that the air bearing lend itself to economical production.

According to the present invention, this object is accomplished in that the rotor is made of a corrosion-resistant steel alloy having hardened bearing surfaces while the bearing element with the mating bearing surface is made of a densely compacted, air-impervious graphite material.

The mating of materials as disclosed in the present invention is suitable in particular measure for air bearings, acted upon from outside, of shafts rotating at very high peripheral speed such as are used on motor spindles for the machining of workpieces. The antifriction conditions needing to be satisfied in such applications are characterized primarily by a very high energy density because in the start-up and run-out phase the shaft is aerostatically supported, and failure of the air film by overloading of the bearing generally occurs at full shaft speed. In this connection it has been shown that, owing to the mating of materials as disclosed in this invention, the frictional energy released upon contact between the shaft and the bearing element can be limited and controlled, in spite of the high peripheral speed, so that the bearing surface and mating bearing surface are not changed in any way that adversely affects the bearing's function. Even at peripheral speeds of the bearing surface of 10,000 ms$^{-1}$, the metallic bearing surface of the rotor is maintained essentially unchanged by any contact and is only blackened somewhat by graphite dust. The mating bearing surface of graphite may be exposed to minor material abrasion, and small score marks may also form there, but these have no adverse effect on the function of the bearing. Even after plural contacts and an accordingly higher amount of material abrasion from the mating bearing surface, the support function of the bearing will be maintained as long as the bearing's air gap does not become too wide in relation to the quantity of supplied air. Where axial bearings are concerned, a considerable increase of bearing clearance is admissible because the appropriate air gap will invariably form on the carrying side. A further significant advantage of the bearing configuration of the present invention resides in that the bearing can be renewed with little effort if it is damaged by overly frequent or excessively long overloading. And because there is no seizing of the bearing, a damaged bearing can be dismantled without difficulty. As a rule, the bearing surface of the rotor turns out to be undamaged or the damage is slight enough to rectify by lapping. The mating bearing surface on the bearing element made of graphite is restored to working order by renewing the component in question. A further advantage has proven to be the fact that the bearing pockets and the very narrow throttle bores can be formed directly in the bearing element, thereby obviating the need to insert separate nozzle elements.

Figure 2:
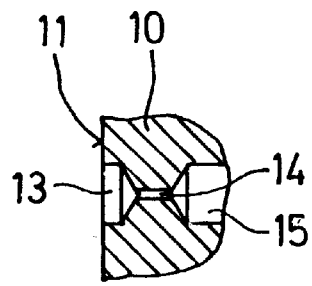

The present invention will be explained in more detail in the following with reference to an embodiment illustrated in the accompanying drawing. In the drawing, FIG. 1 is a cross sectional view of an air bearing for the shaft of a motor spindle; and FIG. 2 is a detail view, on an enlarged scale, of a bearing element with a bearing pocket.

The drawing shows an air bearing 1 for the radial and axial bearing of the shaft 2 of a high-speed frequency-controlled motor spindle for driving a machining tool. The shaft 2 has a cylindrical bearing surface 3 and an annular collar 4 with two parallel, circular-ring shaped bearing surfaces 5, 6 facing away from each other. A housing 7 surrounding the shaft 2 receives therein a sleeve-shaped bearing element 8 with a hollow cylindrical mating bearing surface 9 for radial bearing purposes and, on either side of the annular collar 4, annular-disk shaped bearing elements 10 with mating bearing surfaces 11 facing each other and lying in radial planes for axial bearing purposes. Between the bearing elements 10 is a spacer ring 12 of an axial width exceeding the axial width of the annular collar 4 by the width of the required bearing gap. Provided in the mating bearing surface 9 of the bearing element 8 are bearing pockets 13 arranged along two spaced circumferential lines so as to be equally spaced apart circumferentially. Similarly, equidistant bearing pockets 13 are arranged in the mating bearing surfaces 11 of the bearing elements 10 on the arc of a circle. The bearing pockets 13 are connected via throttle bores 14 to supply bores 15 which are supplied with compressed air via annular grooves 16 in the housing 7. Furthermore, annular chambers 17 communicating with atmosphere either directly or via relief bores 18 are provided adjacent to the mating bearing surfaces 9, 11.

In the described air bearing, the shaft 2 and the integrally molded annular collar 4 are made of stainless steel. The bearing surfaces 3, 5, 6 are hardened and manufactured to the highest geometrical accuracy and precision-lapped surfaces. The bearing elements 8, 10 are air-tight electrographite compacts with an inorganic phosphate content of over 3%, e.g., FE 65 or FE 45Y2 electrographite from the company Schunk GmbH in 35452 Heuchelheim, Germany. The mating bearing surfaces 9, 11 exhibit the same geometrical accuracy and surface quality as the bearing surfaces 3, 5, 6. The bearing gap between the bearing surfaces and the mating bearing surfaces lies in the range of 0.01 to 0.02 mm.

During operation, air cushions are produced by air supplied under pressure between the bearing surfaces 3, 5, 6 and the mating bearing surfaces 9, 11 in the area of the bearing pockets, thereby centering the bearing surfaces 3, 5, 6 of the shaft 2 between the mating bearing surfaces 9, 11 of the bearing elements 8, 10 and preventing contact being made between the bearing surfaces and the mating bearing surfaces. The continuously supplied air escapes through the bearing gap into the annular chambers 17, thus achieving the necessary cooling even at high peripheral speeds of 10,000 $ms^{-1}$ and more. If excessively high radial or axial loading of the air bearing results in temporary overstepping of the load-carrying capacity of the air cushions and hence in contact between a bearing surface rotating at high peripheral speed and a mating bearing surface, the ensuing friction will cause a little graphite material to be abraded from the mating bearing surface, whereby any heating this causes is withstood by the bearing surface and the mating bearing surface. Material abrasion occurs only on the mating bearing surface made of graphite and is of such fine grain that it is discharged from the bearing gap by the bearing air, thus preventing any seizing of the bearing. Even after numerous repeat occurrences of such overloading of the bearing, the changes to the bearing surface and the mating bearing surface are so small that the bearing is not impaired in its functionality. Overhauling of the bearing is not necessary until the bearing gap has widened to an amount allowing the shaft too much freedom of motion. The effort needed to overhaul the bearing is, however, comparatively small. The worn bearing elements can be replaced by new ones and the bearing surfaces of the shaft generally require only relapping. This obviates the necessity of a complete renewal of the shaft, as is the rule with conventional air bearings after just a single case of overloading.

What is claimed is:

1. An air bearing for a rotor adapted to rotate at high peripheral speed, for the shaft of a motor spindle for driving a machining tool, with provision being made for an air gap between a bearing surface of the rotor and a mating bearing surface of a stationary bearing element, said bearing element having in the mating bearing surface several equidistant bearing pockets communicating via calibrated bores in the bearing element with a source of compressed air, characterized in that said rotor is made of a corrosion-resistant steel alloy having hardened bearing surfaces while the bearing element (8, 10) with the mating bearing surface (9, 11) is made of a densely compacted, air-impervious graphite material.

2. The air bearing as claimed in claim 1, characterized in that said bearing element (8, 10) is fabricated from an electrographite material containing inorganic phosphate.

* * * * *